United States Patent
Lin et al.

(10) Patent No.: US 6,968,772 B2
(45) Date of Patent: Nov. 29, 2005

(54) SLIDE-TYPE CYLINDER COUPLING FOR CMP LOAD CUP

(75) Inventors: Jing-Long Lin, Hsinchu (TW); Fu-Ta Ho, Taichung (TW); Sheng-Ting Shu, Hsinchu (TW)

(73) Assignee: Taiwan Semiconductor Manufacturing Co., Ltd., Hsin-Chin (TW)

( * ) Notice: Subject to any disclaimer, the term of this patent is extended or adjusted under 35 U.S.C. 154(b) by 64 days.

(21) Appl. No.: 10/654,524

(22) Filed: Sep. 3, 2003

(65) Prior Publication Data

US 2005/0047858 A1    Mar. 3, 2005

(51) Int. Cl.[7] .............................. F01B 29/00; F16J 1/10
(52) U.S. Cl. ............................ 92/128; 92/129; 92/258
(58) Field of Search ........................ 92/128, 129, 258; 403/13

(56) References Cited

U.S. PATENT DOCUMENTS

| | | | | |
|---|---|---|---|---|
| 5,778,759 A | * | 7/1998 | Johnson | 92/129 |
| 6,171,070 B1 | * | 1/2001 | Mitake | 403/13 |
| 6,186,763 B1 | * | 2/2001 | Scanlan | 425/195 |
| 6,279,453 B1 | * | 8/2001 | Funck | 92/129 |

* cited by examiner

Primary Examiner—Thomas E. Lazo
(74) Attorney, Agent, or Firm—Tung & Associates

(57) ABSTRACT

A slide-type cylinder coupling which is suitable for the quick connect/disconnect attachment of a lift piston on a pedestal lift cylinder to a lift pedestal on a load cup or HCLU station of a chemical mechanical polishing apparatus. The cylinder coupling includes a coupling bolt which is provided on the lift piston and a coupling bracket which is provided on the bottom surface of the lift pedestal. The coupling bolt is slidably inserted in the coupling bracket to removably connect the lift cylinder to the lift pedestal. The coupling bolt is slidably removed from the coupling bracket to disconnect the lift cylinder from the lift pedestal for replacement or maintenance of the lift cylinder.

18 Claims, 3 Drawing Sheets

SLIDE-TYPE CYLINDER COUPLING FOR CMP LOAD CUP

FIELD OF THE INVENTION

The present invention relates to chemical mechanical polishing apparatus for polishing semiconductor wafer substrates. More particularly, the present invention relates to a new and improved, slide-type cylinder coupling for attaching a load cylinder to a load cup used to load and unload semiconductor wafers to and from a CMP apparatus.

BACKGROUND OF THE INVENTION

In the fabrication of semiconductor devices from a silicon wafer, a variety of semiconductor processing equipment and tools are utilized. One of these processing tools is used for polishing thin, flat semiconductor wafers to obtain a planarized surface. A planarized surface is highly desirable on a shadow trench isolation (STI) layer, inter-layer dielectric (ILD) or on an inter-metal dielectric (IMD) layer, which are frequently used in memory devices. The planarization process is important since it enables the subsequent use of a high-resolution lithographic process to fabricate the next-level circuit. The accuracy of a high resolution lithographic process can be achieved only when the process is carried out on a substantially flat surface. The planarization process is therefore an important processing step in the fabrication of semiconductor devices.

A global planarization process can be carried out by a technique known as chemical mechanical polishing, or CMP. The process has been widely used on ILD or IMD layers in fabricating modern semiconductor devices. A CMP process is performed by using a rotating platen in combination with a pneumatically-actuated polishing head. The process is used primarily for polishing the front surface or the device surface of a semiconductor wafer for achieving planarization and for preparation of the next level processing. A wafer is frequently planarized one or more times during a fabrication process in order for the top surface of the wafer to be as flat as possible. A wafer can be polished in a CMP apparatus by being placed on a carrier and pressed face down on a polishing pad covered with a slurry of colloidal silica or aluminum.

A polishing pad used on a rotating platen is typically constructed in two layers overlying a platen, with a resilient layer as an outer layer of the pad. The layers are typically made of a polymeric material such as polyurethane and may include a filler for controlling the dimensional stability of the layers. A polishing pad is typically made several times the diameter of a wafer in a conventional rotary CMP, while the wafer is kept off-center on the pad in order to prevent polishing of a non-planar surface onto the wafer. The wafer itself is also rotated during the polishing process to prevent polishing of a tapered profile onto the wafer surface. The axis of rotation of the wafer and the axis of rotation of the pad are deliberately not collinear; however, the two axes must be parallel. It is known that uniformity in wafer polishing by a CMP process is a function of pressure, velocity and concentration of the slurry used.

A CMP process is frequently used in the planarization of an ILD or IMD layer on a semiconductor device. Such layers are typically formed of a dielectric material. A most popular dielectric material for such usage is silicon oxide. In a process for polishing a dielectric layer, the goal is to remove typography and yet maintain good uniformity across the entire wafer. The amount of the dielectric material removed is normally between about 5000 A and about 10,000 A. The uniformity requirement for ILD or IMD polishing is very stringent since non-uniform dielectric films lead to poor lithography and resulting window-etching or plug-formation difficulties. The CMP process has also been applied to polishing metals, for instance, in tungsten plug formation and in embedded structures. A metal polishing process involves a polishing chemistry that is significantly different than that required for oxide polishing.

Important components used in CMP processes include an automated rotating polishing platen and a wafer holder, which both exert a pressure on the wafer and rotate the wafer independently of the platen. The polishing or removal of surface layers is accomplished by a polishing slurry consisting mainly of colloidal silica suspended in deionixed water or KOH solution. The slurry is frequently fed by an automatic slurry feeding system in order to ensure uniform wetting of the polishing pad and proper delivery and recovery of the slurry. For a high-volume wafer fabrication process, automated wafer loading/unloading and a cassette handler are also included in a CMP apparatus.

As the name implies, a CMP process executes a microscopic action of polishing by both chemical and mechanical means. While the exact mechanism for material removal of an oxide layer is not known, it is hypothesized that the surface layer of silicon oxide is removed by a series of chemical reactions which involve the formation of hydrogen bonds with the oxide surface of both the wafer and the slurry particles in a hydrogenation reaction; the formation of hydrogen bonds between the wafer and the slurry; the formation of molecular bonds between the wafer and the slurry; and finally, the breaking of the oxide bond with the wafer or the slurry surface when the slurry particle moves away from the wafer surface. It is generally recognized that the CMP polishing process is not a mechanical abrasion process of slurry against a wafer surface.

While the CMP process provides a number of advantages over the traditional mechanical abrasion type polishing process, a serious drawback for the CMP process is the difficulty in controlling polishing rates at different locations on a wafer surface. Since the polishing rate applied to a wafer surface is generally proportional to the relative rotational velocity of the polishing pad, the polishing rate at a specific point on the wafer surface depends on the distance from the axis of rotation. In other words, the polishing rate obtained at the edge portion of the wafer that is closest to the rotational axis of the polishing pad is less than the polishing rate obtained at the opposite edge of the wafer. Even though this is compensated for by rotating the wafer surface during the polishing process such that a uniform average polishing rate can be obtained, the wafer surface, in general, is exposed to a variable polishing rate during the CMP process.

Recently, a chemical mechanical polishing method has been developed in which the polishing pad is not moved in a rotational manner but instead, in a linear manner. It is therefore named as a linear chemical mechanical polishing process, in which a polishing pad is moved in a linear manner in relation to a rotating wafer surface. The linear polishing method affords a more uniform polishing rate across a wafer surface throughout a planarization process for the removal of a film layer from the surface of a wafer. One added advantage of the linear CMP system is the simpler construction of the apparatus, and this not only reduces the cost of the apparatus but also reduces the floor space required in a clean room environment.

A typical conventional CMP apparatus 90 is shown in FIG. 1 and includes a base 100; polishing pads 210a, 210b, and 210c provided on the base 100; a head clean load/unload (HCLU) station 360 which includes a load cup 300 for the loading and unloading of wafers (not shown) onto and from, respectively, the polishing pads; and a head rotation unit 400 having multiple polishing pads 410a, 410b, 410c and 410d for holding and fixedly rotating the wafers on the polishing pads.

The three polishing pads 210a, 210b and 210c facilitate simultaneous processing of multiple wafers in a short time. Each of the polishing pads is mounted on a rotatable carousel (not shown). Pad conditioners 211a, 221b and 211c are typically provided on the base 100 and can be swept over the respective polishing pads for conditioning of the polishing pads. Slurry supply arms 212a, 212b and 212c are further provided on the base 100 for supplying slurry to the surfaces of the respective polishing pads.

The polishing heads 410a, 410b, 410c and 410d of the head rotation unit 400 are mounted on respective rotation shafts 420a, 420b, 420c, and 420d which are rotated by a driving mechanism (not shown) inside the frame 401 of the head rotation unit 400. The polishing heads hold respective wafers (not shown) and press the wafers against the top surfaces of the respective polishing pads 210a, 210b and 210c. In this manner, material layers are removed from the respective wafers. The head rotation unit 400 is supported on the base 100 by a rotary bearing 402 during the CMP process.

The load cup 300 includes a circular lift pedestal 310 on which the wafers are placed for loading of the wafers onto the polishing pads 210a, 210b and 210c, and unloading of the wafers from the polishing pads. Before each wafer is unloaded from the lift pedestal 310 onto the polishing pad or unloaded from the polishing pad back onto the lift pedestal 310, the lift pedestal 310 is extended upwardly from the load cup 300 by actuation of a pneumatic pedestal lift cylinder 320 beneath the base 100, as shown in FIG. 1A.

As further shown in FIG. 1A, the pedestal lift cylinder 320 is mounted on a cylinder mount element 350 beneath the base 100. A lift piston 330 is extendible from the cylinder 320 for selective raising and lowering of the lift pedestal 310 and a wafer (not shown) supported thereon for loading and unloading of the wafer on one of the polishing pads 210a, 210b and 210c. On the Mirra/Mesa CMP apparatus available from Applied Materials, Inc., of Santa Clara, Calif., a radial direction error-tolerance coupling 340 releasably connects the upper end of the lift piston 330 to the lift pedestal 310.

After prolonged use, the pedestal lift cylinder 320 becomes worn, and eventually, CDA (clean, dry air) used to effect the lifting and lowering actions of the lift piston 330 leaks from the cylinder 320. Consequently, the cylinder 320 becomes less efficient and must therefore be removed from the load cup 300 and replaced typically about every 6 months. However, this cylinder-removal procedure is cumbersome and time-consuming, as the load cup 300 must be removed from the base 100; the fastening screw which holds the pedestal 310 on the coupling 340 loosened; and the up/down sensors and other accessory equipment removed from the cylinder 320. Those steps are reversed for installation of a replacement cylinder 300 on the load cup 300. Furthermore, the load cup 300 is relatively heavy (about 20 kg), and thus, requires two personnel for safe handling during removal and replacement of the load cup 300 on the base 100. Accordingly, a new and improved, slide-type quick connect/disconnect coupling is needed for attaching a lift piston of a cup actuating cylinder to a lift pedestal of a load cup.

An object of the present invention is to provide a new and improved coupling suitable for attaching a pedestal lift cylinder to a lift pedestal of a load cup for a CMP apparatus.

Another object of the present invention is to provide a new and improved, slide-type coupling suitable for attaching a pedestal lift cylinder to a lift pedestal of a CMP load cup.

Still another object of the present invention is to provide a new and improved cylinder coupling which is suitable for substantially reducing the time required for replacing a pneumatic pedestal lift cylinder for a load cup on a CMP apparatus.

Yet another object of the present invention is to provide a new and improved cylinder coupling which is capable of substantially reducing the number of personnel required for replacement of a pedestal lift cylinder for a load cup on a CMP apparatus.

A still further object of the present invention is to provide a new and improved cylinder coupling including a T-shaped coupling bolt which is provided on a lift piston extendible from a pedestal lift cylinder and a coupling bracket which is provided on the bottom surface of a lift pedestal of a load cup for a CMP or other processing tool, which coupling bolt slidably engages the coupling bracket to provide a quick connect/disconnect attachment of the lift piston to the lift pedestal.

Yet another object of the present invention is to provide a new and improved cylinder coupling which is capable of facilitating quick connect/disconnect attachment between an actuating cylinder and an element to be displaced by the actuating cylinder in a variety of mechanical and industrial applications.

SUMMARY OF THE INVENTION

In accordance with these and other objects and advantages, the present invention is generally directed to a new and improved, slide-type cylinder coupling which is suitable for the quick connect/disconnect attachment of a lift piston on a pedestal lift cylinder to a lift pedestal on a load cup or HCLU station of a chemical mechanical polishing apparatus. The cylinder coupling includes a coupling bolt which is provided on the lift piston and a coupling bracket which is provided on the bottom surface of the lift pedestal. The coupling bolt is slidably inserted in the coupling bracket to removably connect the lift cylinder to the lift pedestal. The coupling bolt is slidably removed from the coupling bracket to disconnect the lift cylinder from the lift pedestal for replacement or maintenance of the lift cylinder, for example.

BRIEF DESCRIPTION OF THE DRAWINGS

The invention will now be described, by way of example, with reference to the accompanying drawings, in which.

DESCRIPTION OF THE PREFERRED EMBODIMENTS

The present invention has particularly beneficial utility in the quick connect/disconnect attachment of a lift piston on a pedestal lift cylinder to a lift pedestal on a load cup for the loading and unloading of semiconductor wafer substrates onto and from, respectively, polishing pads of a chemical mechanical polishing apparatus. However, the invention is not so limited in application, and while references may be made to such CMP apparatus, the invention is more generally applicable to connecting a piston cylinder to an element to be actuated or displaced by the cylinder in a variety of industrial and mechanical applications.

Shown throughout the drawings, the present invention is directed to a new and improved, slide-type coupling which facilitates the quick connect/disconnect attachment of a lift piston extendible from a pedestal lift cylinder with a lift pedestal on a load cup or HCLU station of a CMP apparatus. The coupling includes a coupling bracket which is mounted typically on the bottom surface of the lift pedestal and slidably receives a T-shaped coupling bolt which is provided on the lift piston. The slide-type coupling substantially reduces the time required for periodic replacement of the pedestal lift cylinder on the load cup and further, reduces the manpower required for the replacement operation.

Figure 1:
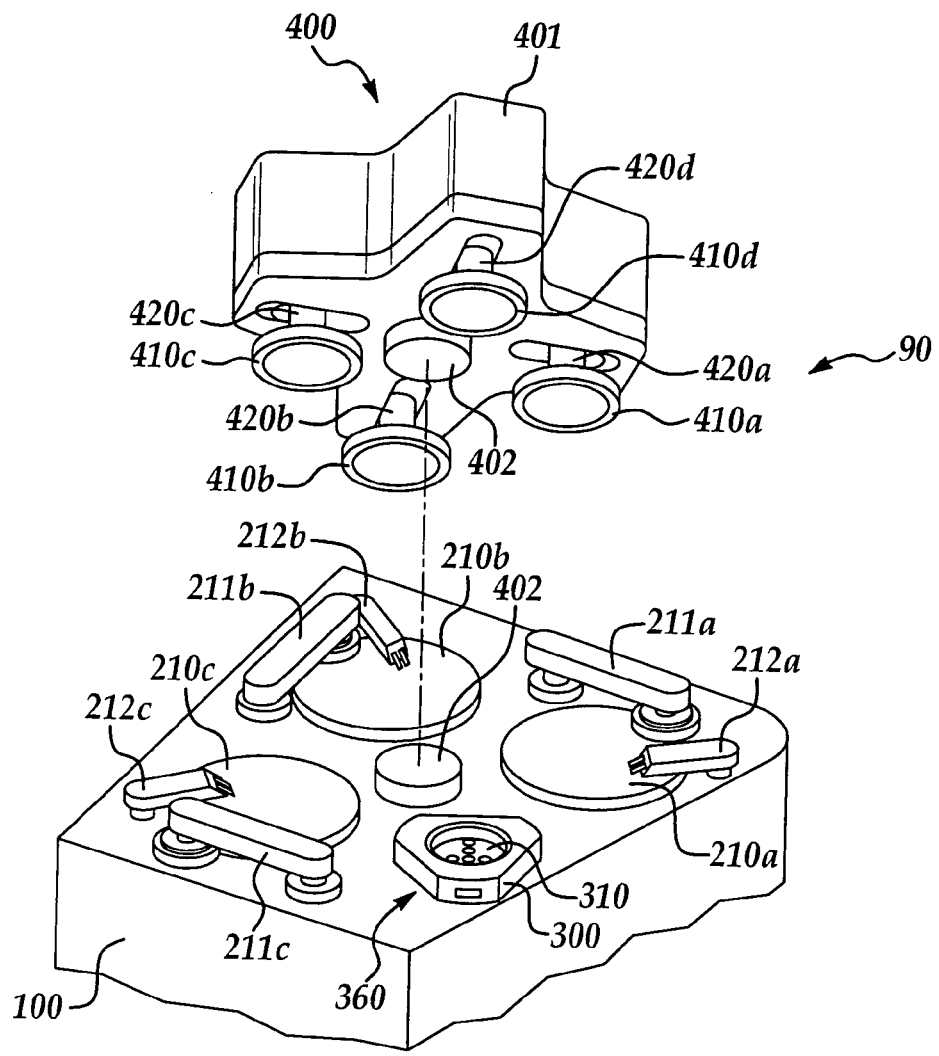
FIG. 1 is a perspective view of a typical conventional chemical mechanical polishing apparatus for the simultaneous polishing of multiple wafers.
Figure 1A:
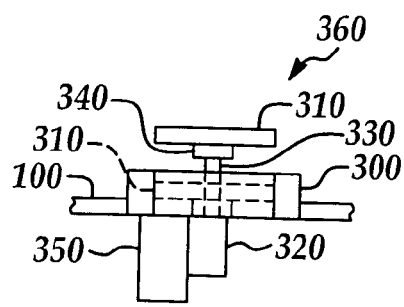
FIG. 1A is a side view of a conventional head clean load/unload (HCLU) station of the CMP apparatus of FIG. 1.
Figure 5:
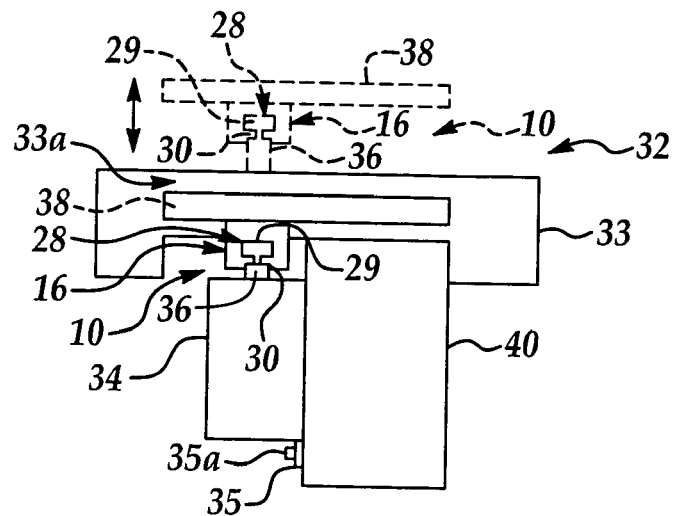
FIG. 5 is a side view of an HCLU station of a CMP apparatus, with the slide-type cylinder coupling of the present invention attaching a pedestal lift cylinder to a lift pedestal of a load cup at the HCLU station in typical implementation of the present invention.

Referring initially to FIG. 5, an illustrative embodiment of a slide-type cylinder coupling of the present invention is generally indicated by reference numeral 10. In typical application, the cylinder coupling 10 is used to removably connect the upper end of a lift piston 36, slidably extendible from a typically pneumatic pedestal lift cylinder 34, to a lift pedestal 38 on a load cup 33 of an HCLU (head clean load/unload) station 32, as hereinafter described in more detail. The HCLU station 32 is a component of a conventional CMP apparatus (not shown) which is used in the chemical mechanical polishing of multiple semiconductor wafers, as heretofore described with respect to the conventional CMP apparatus 90 of FIG. 1. The lift pedestal 38 of the load cup 33 is used to lift individual wafers (not shown) for loading of the wafers onto polishing pads (not shown) of the CMP apparatus and unloading of the wafers from the polishing pads. The pedestal lift cylinder 34 is removably mounted typically using screws (not shown) on a cylinder mount element 40 that is attached to the load cup 33 and extends downwardly therefrom. A pedestal opening 33a is provided in the load cup 33 and accommodates the lift pedestal 38 when the lift pedestal 38 is in the lowered configuration and the lift piston 36 is retracted in the pedestal lift cylinder 34, as indicated by the solid lines in FIG. 5. Upon extension of the lift piston 36 from the pedestal lift cylinder 34 to facilitate transfer of a wafer (not shown) from the lift pedestal 38 to a polishing pad or from the polishing pad back to the lift pedestal 38, the lift pedestal 38 is raised from the pedestal opening 33a, as indicated by the phantom lines.

Figure 2:
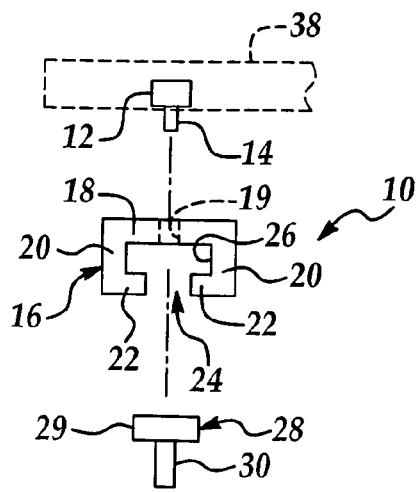
FIG. 2 is an exploded view of an illustrative embodiment of a slide-type cylinder coupling of the present invention.
Figure 2:
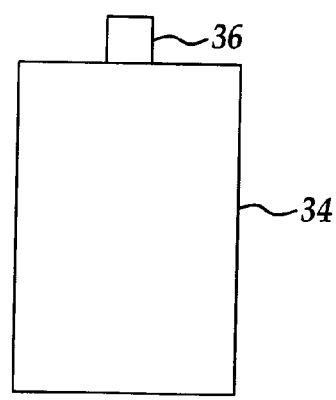
Figure 3:
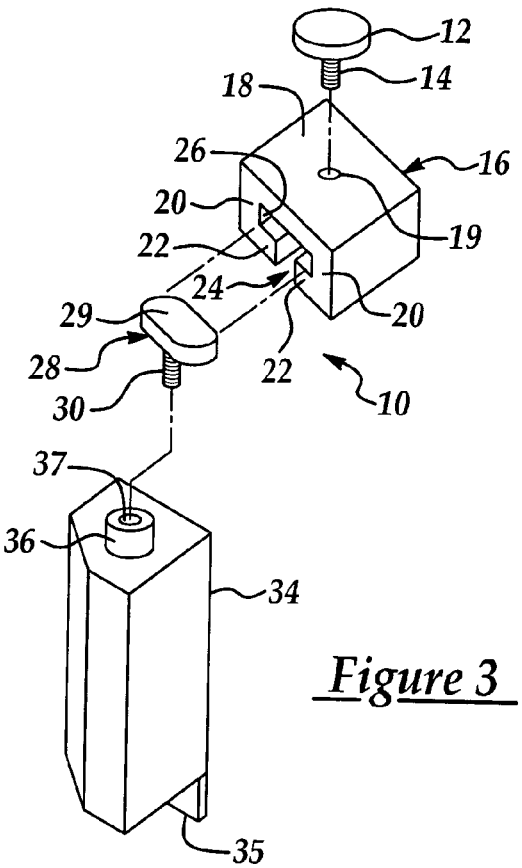
FIG. 3 is an exploded, perspective view of the slide-type cylinder coupling of the present invention.
Figure 4:
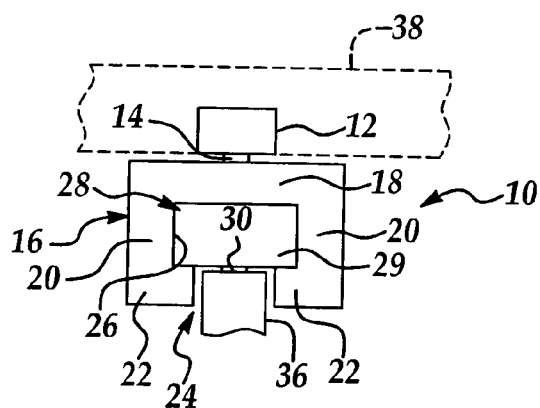
FIG. 4 is a front view of the slide-type cylinder coupling, with the coupling bolt element engaging the coupling bracket element of the cylinder coupling.

Referring next to FIGS. 2–4, the cylinder coupling 10 includes a coupling bracket 16 which may be generally C-shaped and is typically stainless steel but may be any other metal or other material consistent with the use requirements of the coupling bracket 16. The coupling bracket 16 includes a bracket base 18 having a central bolt opening 19. As shown in FIGS. 2 and 3, the bolt opening 19 receives a threaded shank 14 of a bracket bolt 12 which engages the lift pedestal 38 on the load cup 33 of the HCLU station 32 in conventional fashion, as shown in FIG. 5 and hereinafter further described, to mount the coupling bracket 16 on the bottom surface of the lift pedestal 38. Parallel bracket arms 20 extend from the bracket base 18 in spaced-apart relationship with respect to each other, defining a bracket track 26 therebetween. Bracket flanges 22 extend inwardly from the respective bracket arms 20, toward each other. A bracket opening 24 is defined between the adjacent bracket flanges 22 and communicates with the bracket track 26.

The cylinder coupling 10 further includes a T-shaped coupling bolt 28 having an elongated, typically elliptical coupling head 29 and a threaded shank 30 extending therefrom. The threaded shank 30 threadibly engages a bolt opening 37 (FIG. 3) provided in the upper end of the lift piston 36 slidably extendible from the pedestal lift cylinder 34 of the HCLU station 32, to mount the coupling bolt 28 on the lift piston 36. Accordingly, as shown in FIG. 3, the coupling head 29 of the coupling bolt 28 is capable of slidable insertion into the companion bracket track 26 of the coupling bracket 16, wherein the bracket opening 24 of the coupling bracket 16 receives the upper end portion of the lift piston 36, as shown in FIG. 4, to removably connect the lift piston 36 to the lift pedestal 38. Conversely, in the same but reverse manner the coupling head 29 of the coupling bolt 28 may be slidably removed from the bracket track 26 of the coupling bracket 16.

Referring again to FIGS. 2–5, in typical application the pedestal lift cylinder 34 is installed on the HCLU station 32 in the following manner. First, the coupling bracket 16 of the cylinder coupling 10 is mounted on the bottom surface of the lift pedestal 38 by threading the threaded shank 14 of the bracket bolt 12 into the bolt opening 19 of the coupling bracket 16. The coupling bolt 28 is attached to the upper end of the lift piston 36 by threading the threaded shank 30 of the coupling bolt 28 into the bolt opening 37 of the lift piston 36, as shown in FIG. 3. Next, the pedestal lift cylinder 34 is attached to the lift pedestal 38 by slidably inserting the elongated coupling head 29 of the coupling bolt 28 into the bracket track 26 of the coupling bracket 16, with the upper end portion of the lift piston 36 extending through the bracket opening 24 of the coupling bracket 16, as shown in FIG. 4. Finally, the pedestal lift cylinder 34 is attached to the cylinder mount element 40 beneath the load cup 33, typically by extending mount screws 35a through respective screw openings (not shown) provided in a mount bracket 35 on the pedestal lift cylinder 34, as shown in FIG. 5, and threading the mount screws 35a into respective openings (not shown) in the cylinder mount element 40. Accordingly, after attachment of the air connections (not shown) of the pedestal lift cylinder 34 to the air source (not shown), in conventional fashion, the pedestal lift cylinder 34 is properly positioned for selectively raising and lowering the lift pedestal 38 with respect to the pedestal opening 33a of the lift pedestal 38. Lifting of the lift pedestal 38 from the pedestal opening 33a is accomplished by upward extension of the lift piston 36 from the pneumatic pedestal lift cylinder 34, as indicated by the phantom lines in FIG. 5, whereas lowering of the lift pedestal 38 back into the pedestal opening 33a of the load cup 33 is accomplished by retraction of the lift piston 36 into the pedestal lift cylinder 34, as indicated by the solid lines in FIG. 4, in conventional fashion. This raising of the lift pedestal 38 facilitates transfer of a wafer (not shown) resting on the upper surface of the lift pedestal 38 to a polishing pad (not shown) on the CMP apparatus, as well as transfer of the wafer from the polishing pad back onto the lift pedestal 38 after the CMP process, as is known by those skilled in the art.

Throughout repeated usage, the pneumatic pedestal lift cylinder 34 is subjected to wear and tear which eventually causes leakage of pressurized air from the cylinder 34. This renders the cylinder 34 ineffective and necessitates replacement of the cylinder 34 on the HCLU station 32. Typically, this replacement process must be performed about every six months in order to ensure effective, smooth and reliable operation of the HCLU station 32. Accordingly, this replacement process is carried out by first removing the old pedestal lift cylinder 34 from the cylinder mount element 40 of the HCLU station 32, typically by unthreading the mount screws 35a from the cylinder mount element 40 and from the mount bracket 35 on the cylinder 34. Next, the old pedestal lift cylinder 34 is disconnected from the lift pedestal 38 simply by sliding the elongated coupling head 29 of the coupling bolt 28 from the bracket opening 24 of the coupling bracket 16. The coupling bolt 28 may then be unthreaded from the lift piston 36 of the old pedestal lift cylinder 34 and threadibly attached to the lift piston 36 of a replacement pedestal lift cylinder 34. Alternatively, a new coupling bolt 28 may be attached to the lift piston 36 of the replacement cylinder 34. The replacement pedestal lift cylinder 34 is then connected to the lift pedestal 38 by sliding the coupling head 29 of the coupling bolt 28 on the piston 36 of the replacement cylinder 34 into the bracket track 26 of the coupling bracket 16, which remains attached to the bottom surface of the lift pedestal 38. Finally, the replacement cylinder 34 is mounted on the cylinder mount element 40 typically using the mount screws 35a, as heretofore described. It will be appreciated by those skilled in the art that the facility for slidably attaching the lift piston 36 of the pedestal lift cylinder 34 to the lift pedestal 38 of the load cup 33, provided by the coupling bracket 16 and companion coupling bolt 28 of the cylinder coupling 10, facilitates quick and easy replacement of the pedestal lift cylinder 34 on the HCLU station 32. Moreover, the cylinder-replacement process may be carried out without the need for removing the load cup 33 from the CMP apparatus, thus enabling the cylinder-replacement process to be carried out by one person.

Figure 6:
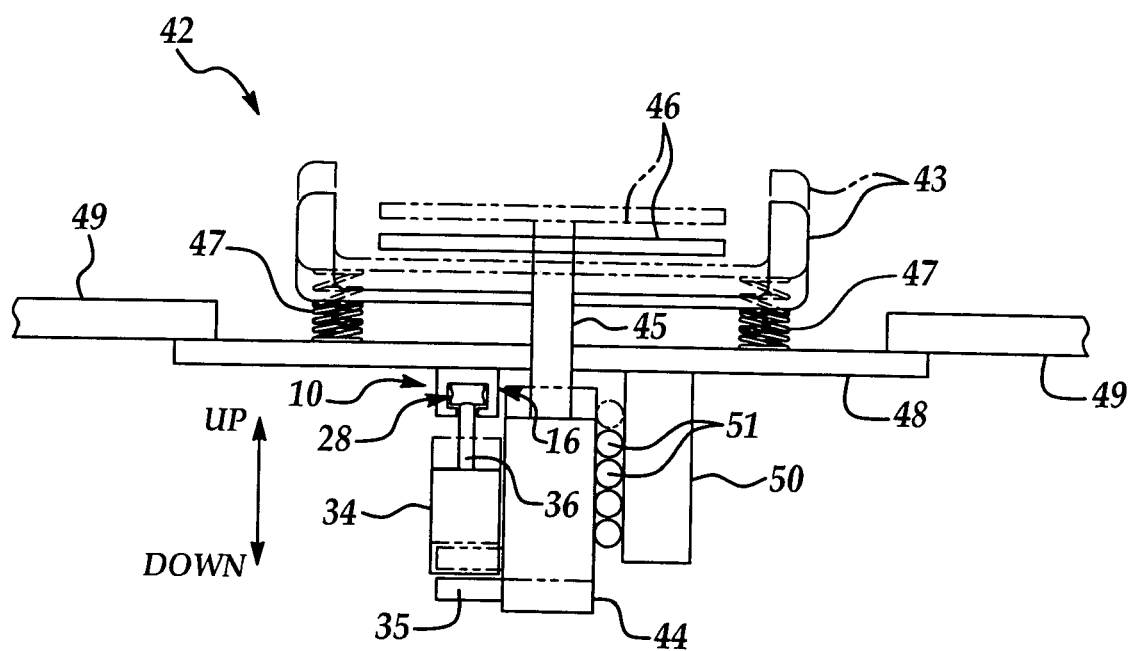
FIG. 6 is a side view of an HCLU station in another application of the slide-type cylinder coupling of the present invention.

Referring next to FIG. 6, in another application of the cylinder coupling 10 of the present invention, an HCLU station 42 includes a mainframe 49 which supports a lift platform 48. A pedestal cylinder 44 includes an extendible piston 45 that extends through the lift platform 48. The piston 45 further extends through the bottom of a load cup 43, and a pedestal 46 is provided on the extending upper end of the piston 45. A resilient seal 47 is interposed between the bottom of the load cup 43 and the upper surface of the lift platform 48. A bearing guide 50 extends downwardly from the bottom surface of the lift platform 48, and a linear bearing 51 is interposed between the pedestal cylinder 44 and the bearing guide 50. A lift cylinder 34 is mounted to the pedestal cylinder 44 typically using a mount bracket 35. The coupling bracket 16 of the cylinder coupling 10 is mounted on the bottom surface of the lift platform 48 and on the extending end of a lift piston 36 which is extendible from the pedestal lift cylinder 34 using the coupling bolt 28. In operation, the lift piston 36 is extended from the pedestal lift cylinder 34, thereby raising the load cup 43 as the piston 45 is extended from the pedestal cylinder 44 and raises the pedestal 46 and a substrate (not shown) supported thereon, as shown in phantom.

While the preferred embodiments of the invention have been described above, it will be recognized and understood that various modifications can be made in the invention and the appended claims are intended to cover all such modifications which may fall within the spirit and scope of the invention.

What is claimed is:

1. A cylinder coupling for connecting a piston on an actuating cylinder to an object, comprising:
    a coupling bracket for attachment to the object;
    a coupling bolt for attachment to the piston and slidably engaging said coupling bracket; and
    a bracket bolt for attachment to the object and wherein said coupling bracket threadibly engages said bracket bolt.

2. The cylinder coupling of claim 1 wherein said coupling bracket comprises an elongated bracket track for slidably receiving said coupling bolt.

3. The cylinder coupling of claim 2 further comprising a bracket bolt for attachment to the object and wherein said coupling bracket threadibly engages said bracket bolt.

4. The cylinder coupling of claim 1 wherein said coupling bracket comprises a bracket base, a pair of spaced-apart bracket arms extending from said bracket base, a bracket track defined between said bracket arms for slidably receiving said coupling bolt, and a pair of bracket flanges extending inwardly toward each other from said bracket arms, respectively.

5. The cylinder coupling of claim 4 further comprising a bracket bolt for attachment to the object and wherein said coupling bracket threadibly engages said bracket bolt.

6. The cylinder coupling of claim 4 wherein said coupling bolt comprises a threaded shank for threadibly engaging the piston of the actuating cylinder and an elongated coupling head carried by said threaded shank for slidably engaging said bracket track.

7. The cylinder coupling of claim 6 further comprising a bracket bolt for attachment to the object and wherein said coupling bracket threadibly engages said bracket bolt.

8. A cylinder coupling for connecting a lift piston of a pedestal lift cylinder to a lift pedestal of a load cup on a CMP apparatus, comprising:
    a generally C-shaped coupling bracket for attachment to the lift pedestal;
    a coupling bolt for attachment to the lift piston and slidably engaging said coupling bracket; and
    a bracket bolt for attachment to the lift pedestal and wherein said coupling bracket threadibly engages said bracket bolt.

9. The cylinder coupling of claim 8 wherein said coupling bracket comprises an elongated bracket track for slidably receiving said coupling bolt.

10. The cylinder coupling of claim 9 further comprising a bracket bolt for attachment to the lift pedestal and wherein said coupling bracket threadibly engages said bracket bolt.

11. The cylinder coupling of claim 8 wherein said coupling bracket comprises a bracket base, a pair of spaced-apart bracket arms extending from said bracket base, a bracket track defined between said bracket arms for slidably receiving said coupling bolt, and a pair of bracket flanges extending inwardly toward each other from said bracket arms, respectively.

12. The cylinder coupling of claim 11 further comprising a bracket bolt for attachment to the lift pedestal and wherein said coupling bracket threadibly engages said bracket bolt.

13. The cylinder coupling of claim 11 wherein said coupling bolt comprises a threaded shank for threadibly engaging the lift piston and an elongated coupling head carried by said threaded shank for slidably engaging said bracket track.

14. The cylinder coupling of claim 13 further comprising a bracket bolt for attachment to the lift pedestal and wherein said coupling bracket threadibly engages said bracket bolt.

15. A method of attaching a lift piston of a pedestal lift cylinder to a lift pedestal of a load cup on a CMP apparatus, comprising the steps of:
providing a coupling bracket on the lift pedestal;
providing coupling bolt on the lift piston; and
causing slidable engagement of said coupling bolt with said coupling bracket.

16. The method of claim 15 further comprising the step of attaching a bracket bolt to the lift pedestal and wherein said providing a coupling bracket on the lift pedestal comprises the step of causing threadible engagement of said coupling bracket with said bracket bolt.

17. The method of claim 15 wherein said coupling bolt comprises a threaded shank for threadibly engaging the lift piston and an elongated coupling head carried by said threaded shank for slidably engaging said coupling bracket.

18. The method of claim 17 further comprising the steps of attaching a bracket bolt to the lift pedestal and wherein said providing a coupling bracket on the lift pedestal comprises the step of causing threadible engagement of said coupling bracket with said bracket bolt.

* * * * *